(12) United States Patent
Bischof et al.

(10) Patent No.: US 7,845,855 B2
(45) Date of Patent: Dec. 7, 2010

(54) INTEGRAL TILTING PAD BEARING

(75) Inventors: Kenneth R. Bischof, Oconomowoc, WI (US); Randy Gerard Lindner, Wausau, WI (US); Timothy J. Renard, Germantown, WI (US); Thomas Lamar Richards, II, Antigo, WI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 722 days.

(21) Appl. No.: 11/787,146

(22) Filed: Apr. 13, 2007

(65) Prior Publication Data

US 2008/0253706 A1    Oct. 16, 2008

(51) Int. Cl.
F16C 17/03    (2006.01)
F16C 32/06    (2006.01)

(52) U.S. Cl. ...................................... 384/117; 384/308
(58) Field of Classification Search ................. 384/117, 384/306–312
See application file for complete search history.

(56) References Cited

U.S. PATENT DOCUMENTS

| | | | |
|---|---|---|---|
| 1,991,461 A | 2/1935 | Howarth | |
| 2,110,464 A | 3/1938 | Kingsbury | |
| 2,314,703 A | 3/1943 | Howarth | |
| 2,347,663 A | 5/1944 | Carnahan | |
| 2,424,028 A | 7/1947 | Haeberlein | |
| 2,778,696 A | 1/1957 | Lease | |
| 2,890,916 A | 6/1959 | Maynard | |
| 2,906,571 A | 9/1959 | Casacci | |
| 3,062,598 A | 11/1962 | Summers | |
| 3,107,955 A | 10/1963 | Trumpler | |
| 3,132,908 A | 5/1964 | Grotzinger | |
| 3,142,519 A | 7/1964 | Abramovitz | |
| 3,160,450 A | 12/1964 | Gentiluomo | |
| 3,172,709 A * | 3/1965 | Baudry | 384/117 |
| 3,384,425 A | 5/1968 | Brown | |
| 3,424,505 A | 1/1969 | Pizzitola | |

(Continued)

FOREIGN PATENT DOCUMENTS

DE    853990 (C)    10/1952

(Continued)

OTHER PUBLICATIONS

PCT International Search Report and Written Opinion from the International Searching Authority relating to International Application No. PCT/US2008/058581, date of mailing of the International Search Report Mar. 23, 2009 (15 pgs.).

Primary Examiner—Thomas R Hannon
(74) Attorney, Agent, or Firm—Foley & Lardner LLP (57) ABSTRACT

There is disclosed a bearing to support a rotating shaft. The bearing includes a cylindrical housing defining a central opening. A plurality of bearing pads integrally coupled to the housing with each bearing pad having a circumferential surface defining a portion of the central opening. A plurality of pins disposed in a bore defined in the housing, with each pin aligned as a pivot for each corresponding pad. Each pad can tilt about the pin in relation to the rotating shaft. Each pad is coupled to the housing by a pair of webs defined by a plurality of cuts forming a plurality of openings in the housing substantially parallel to a line tangent with the circumferential surface of the pad. Each pin is aligned parallel with the rotating pad.

12 Claims, 12 Drawing Sheets

U.S. PATENT DOCUMENTS

| | | | |
|---|---|---|---|
| 3,460,875 | A | 8/1969 | Kelley |
| 3,586,401 | A | 6/1971 | Gravelle |
| 3,675,977 | A | 7/1972 | Arsenius et al. |
| 3,677,612 | A | 7/1972 | Barnett et al. |
| 3,687,506 | A | 8/1972 | Dee |
| 3,791,703 | A | 2/1974 | Ifield |
| 3,829,180 | A | 8/1974 | Gardner |
| 3,881,791 | A | 5/1975 | Hentschel |
| 3,899,224 | A | 8/1975 | Schuller et al. |
| 3,902,770 | A | 9/1975 | Hepp et al. |
| 3,951,475 | A | 4/1976 | Okano et al. |
| 3,954,309 | A | 5/1976 | Hutson et al. |
| 3,971,602 | A | 7/1976 | Anderson |
| 4,005,914 | A | 2/1977 | Newman |
| 4,099,799 | A | 7/1978 | Etsion et al. |
| 4,118,079 | A | 10/1978 | Newman et al. |
| 4,133,585 | A | 1/1979 | Licht |
| 4,178,046 | A | 12/1979 | Silver et al. |
| 4,227,113 | A | 10/1980 | Walsh |
| 4,227,752 | A | 10/1980 | Wilcock |
| 4,243,274 | A | 1/1981 | Greene |
| 4,253,714 | A | 3/1981 | Bhushan |
| 4,268,094 | A | 5/1981 | Greene |
| 4,290,656 | A | 9/1981 | Daugherty |
| 4,319,790 | A | 3/1982 | Thomson |
| 4,325,585 | A | 4/1982 | Sugita |
| 4,335,925 | A | 6/1982 | Stopp |
| 4,382,199 | A | 5/1983 | Isaacson |
| 4,403,873 | A | 9/1983 | Gardner |
| 4,435,839 | A | 3/1984 | Gu et al. |
| 4,459,047 | A | 7/1984 | Silver |
| 4,496,251 | A | 1/1985 | Ide |
| 4,515,486 | A | 5/1985 | Ide |
| 4,526,482 | A | 7/1985 | Ide |
| 4,560,014 | A | 12/1985 | Geczy |
| 4,583,870 | A | 4/1986 | Schnittger |
| 4,600,317 | A * | 7/1986 | Mori .................... 384/117 |
| 4,639,146 | A | 1/1987 | Yoshioka et al. |
| 4,647,227 | A | 3/1987 | Clebant |
| 4,654,939 | A | 4/1987 | Silver |
| 4,657,411 | A | 4/1987 | Bath |
| 4,668,106 | A | 5/1987 | Gu |
| 4,671,677 | A | 6/1987 | Heshmat et al. |
| 4,699,525 | A | 10/1987 | Mizobuchi et al. |
| 4,725,151 | A | 2/1988 | Orndorff, Jr. |
| 4,726,695 | A | 2/1988 | Showalter |
| 4,738,453 | A | 4/1988 | Ide |
| 4,738,550 | A | 4/1988 | Gardner |
| 4,767,221 | A | 8/1988 | Paletta et al. |
| 4,767,222 | A | 8/1988 | Paletta et al. |
| 4,913,563 | A * | 4/1990 | Veronesi et al. ............ 384/312 |
| 5,112,143 | A | 5/1992 | Ide |
| 5,222,815 | A | 6/1993 | Ide |
| 5,284,392 | A | 2/1994 | Ide |
| 5,372,431 | A | 12/1994 | Ide |
| 5,513,917 | A | 5/1996 | Ide et al. |
| 5,531,522 | A | 7/1996 | Ide et al. |
| 5,547,287 | A | 8/1996 | Zeidan |
| 5,558,444 | A | 9/1996 | Ide |
| 5,593,232 | A | 1/1997 | Maier |
| 5,603,574 | A | 2/1997 | Ide et al. |
| 5,664,888 | A | 9/1997 | Sabin |
| 5,743,654 | A | 4/1998 | Ide et al. |
| 6,170,989 | B1 | 1/2001 | Zeidan |
| 6,379,046 | B1 | 4/2002 | Zeidän |
| 6,460,635 | B1 | 10/2002 | Kalsi et al. |

FOREIGN PATENT DOCUMENTS

| | | |
|---|---|---|
| DE | 879 116 | 6/1953 |
| EP | 0 283 981 | 9/1988 |
| EP | 0 283 982 | 9/1988 |
| EP | 0 343 620 A2 | 11/1989 |
| FR | 1.010.959 | 6/1952 |
| GB | 977575 (A) | 12/1964 |
| GB | 2 173 881 A | 10/1986 |
| JP | 58000124 A | 1/1983 |

* cited by examiner

INTEGRAL TILTING PAD BEARING

FIELD

The present disclosure relates generally to the field of pad type bearings. More specifically, the disclosure relates to a bearing with integral movable pads. The bearing may be a hydrostatic movable pad type bearings.

BACKGROUND

Hydrodynamic bearings may include one or more pads that are allowed to move or "float" between two parts that are moving relative to each other. The pads are generally trapped in a pocket or chamber between two parts that move relative to each other. A fluid pressure acts on the pad to urge it towards one of the moving parts. In bearings known as tilt-pad bearings, the pads are also allowed to pivot such that a wedge-shaped film of lubrication can form between the pad and one of the moving parts, for example a rotating shaft. Tilt-pad bearings are desirable because they provide exceptional stability characteristics. This stability is partially caused by reducing the cross-coupled stiffness of the pads by allowing them to pivot about their own pivot points.

However, tilt-pad bearings do have disadvantages. Tilt-pad bearings generally include a large number of moving parts including a housing or shell, pads, and pad pivots. Each of these parts must be machined to a very high tolerance to overcome stacked tolerance of the finished assembly and yield an acceptable shaft clearance. Such a shortcoming requires very careful attention to the materials choice, design, and manufacturing of each of the components of the tilt-pad bearing.

SUMMARY

There is provided a bearing to support a rotating shaft. The bearing includes a cylindrical housing defining a central opening. The bearing also includes a plurality of bearing pads integrally coupled to the housing with each bearing pad having a circumferential surface defining a portion of the central opening. The bearing also includes a plurality of pins disposed in a bore defined in the housing, with each pin aligned as a pivot for each corresponding pad. Each pad can tilt about the pin in relation to the rotating shaft. Each pad is coupled to the housing by a pair of webs defined by a plurality of cuts forming a plurality of openings in the housing substantially parallel to a line tangent with the circumferential surface of the pad. Each pin is aligned parallel with the rotating pad.

There is provided a method for enhancing shaft rotation in a bearing. The bearing includes a cylindrical housing defining a central opening. A plurality of bearing pads are integrally coupled to the housing with each bearing pad having a circumferential surface defining a portion of the central opening. A plurality of pins are disposed in a bore defined in the housing, with each pin aligned as a pivot for each corresponding pad. Each pad can tilt about the pin in relation to the rotating shaft. The method includes determining a force to be exerted on at least one pad in the bearing; determining a deformation of one of the bore and pin from the exerted force on the pad; and configuring one of the bore and pin to compensate for the determined deformation. The shaft rotation is enhanced by reducing the stress concentration in one of the bore and pin caused by the determined deformation.

There is also provided a thrust bearing. The thrust bearing includes a cylindrical housing defining a central opening. The thrust bearing also includes a plurality of bearing pads integrally coupled to the housing with each bearing pad having a circumferential surface defining a portion of the central opening. The thrust bearing also includes a plurality of pins disposed in a bore defined in the housing, with each pin aligned as a pivot for each corresponding pad. The thrust bearing also includes a thrust collar coupled to the rotating shaft aligned with the bearing pads. Each pad can tilt about the pin in relation to the rotating shaft. Each pad is coupled to the housing by a pair of webs defined by a plurality of cuts forming a plurality of openings in the housing substantially normal to the rotational axis of the shaft. Each pin is aligned normal to the rotating shaft.

DETAILED DESCRIPTION OF THE PREFERRED EMBODIMENTS

Figure 1:
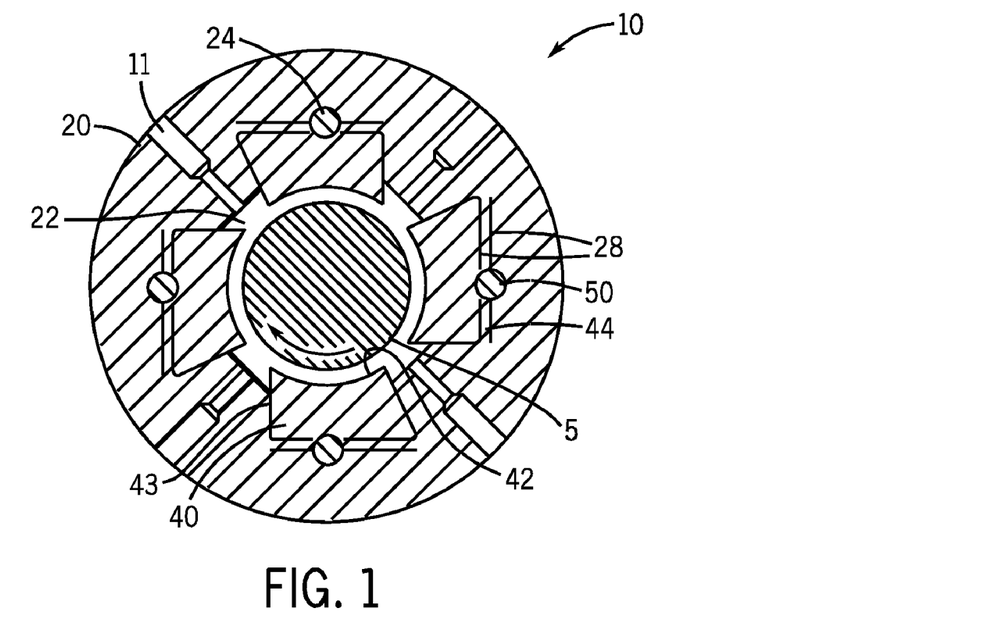
FIG. 1 is a top plan view of an exemplary embodiment of a bearing including a tilt-pad integral with a support structure.

Referring to FIG. 1, a bearing 10 is shown according to an exemplary embodiment. The bearing 10 is a generally cylindrical body that is configured to radially support a rotating shaft 5. The bearing 10 includes a cylindrical housing 20, one or more bearing pads 40 coupled to the outer housing 20, one or more pins 50 trapped between the bearing pads 40 and the housing 20, and may include a fluid between the other components.

Figure 2:
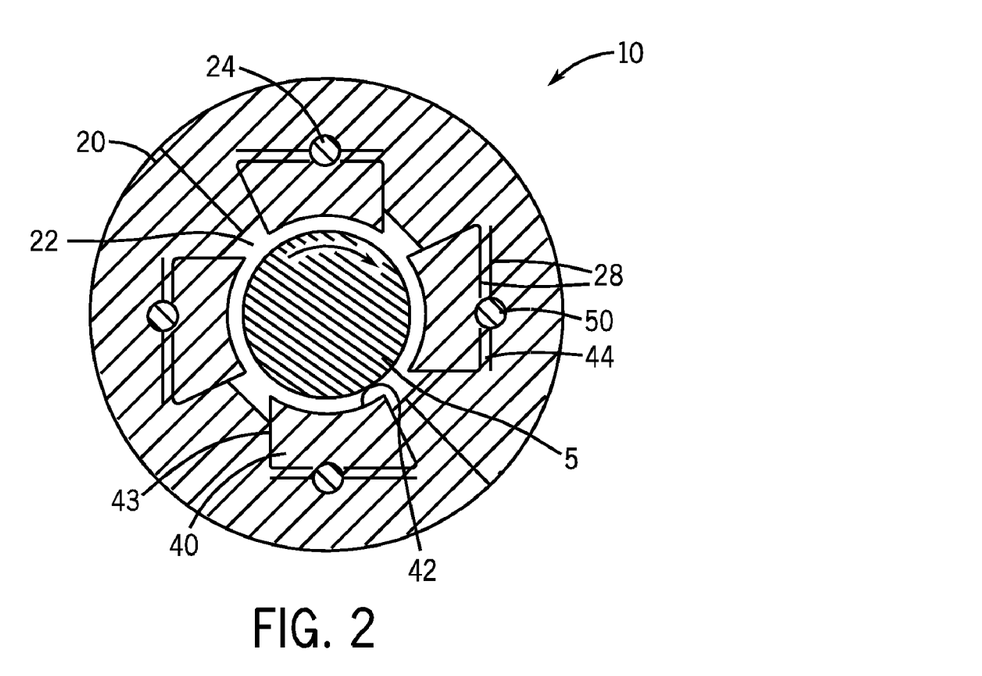
FIG. 2 is a top plan view of the bearing illustrated in FIG. 1, with the support structure including two portions.
Figure 3:
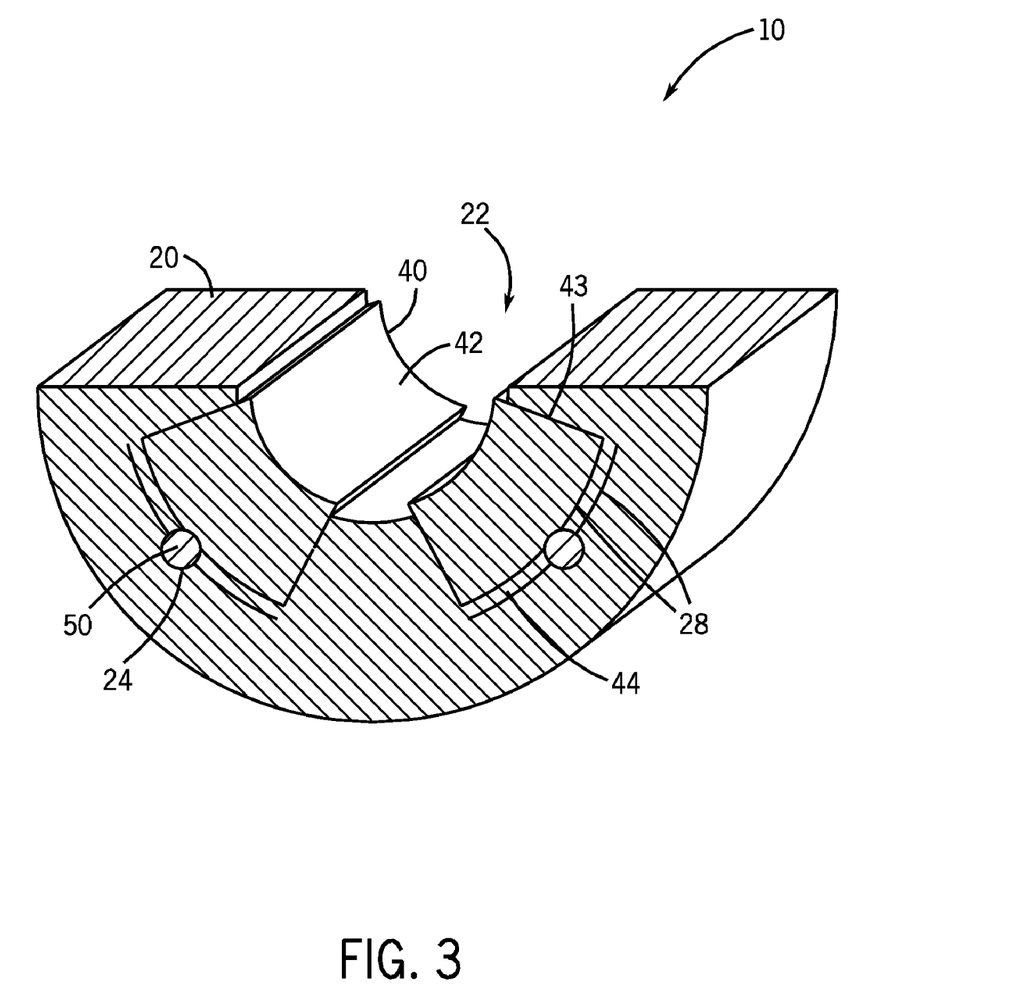
FIG. 3 is a perspective view of one portion of the bearing structure illustrated in FIG. 2.

The housing 20 (e.g., pad support structure, shell, etc.) provides the main body of the bearing 10. The housing 20 forms a central opening 22 that receives the rotating shaft 5. According to various exemplary embodiments, the housing 20 may be a single body or may be split into two or more segments as shown in FIGS. 2-3 and coupled together around the rotating shaft 5.

Figure 8A:
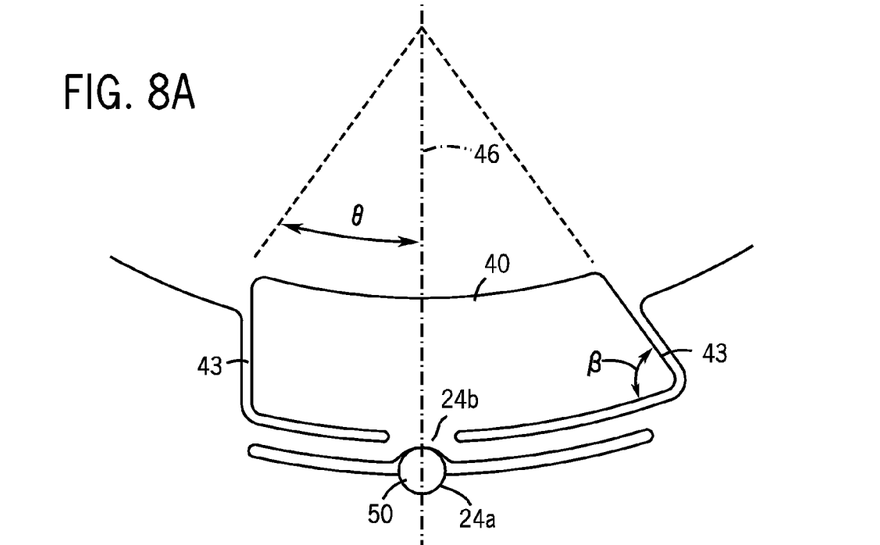
FIG. 8A is an illustration of a tilt pad integral with a support structure configured to rotate about a pin positioned in a bore defined in the support structure on a radial center line of the tilt pad.

One or more bearing pads 40 (e.g., tilt pads, rotational pads, etc.) are integrally formed with the housing 20 and are arranged radially around the central opening 22. Each bearing pad 40 includes a circumferential surface 42 that defines a portion of the central opening and supports the rotating shaft 5 and a pair of side walls 43. The side walls 43 may be substantially normal to the circumferential surface 42 or may be angled relative to the circumferential surface 42. If the side walls 43 are slanted inward at an angle β, as shown in FIG. 8A, the geometry of the housing 20 will retain the bearing pad 40 even if the bearing pad 40 breaks away from the housing 20. The bearing pads 40 are coupled to the housing 20 with a pair of thin members or webs 44 (e.g., walls, struts, arms, etc.) and are allowed to move relative to the housing 20. Integrally forming the bearing pads 40 and the housing 20 as a single unitary body provides several advantages. With a single body it is possible to achieve tighter tolerances between the bearing and the rotating shaft than is generally possible with a bearing with separately machined and assembled components. The webs 44 help to reduce bearing pad flutter by providing a selectable predetermined minimal rotational stiffness to the bearing pads 40. The webs 44 further provide a mechanism to retain the bearing pads 40 within the housing 20.

According to an exemplary embodiment, the bearing pads 40 and webs 44 are formed by a multitude of gaps or cuts 28. The cuts 28 that form the webs 44 are generally parallel to a line tangent to the circumferential surface 42 of the bearing pad 40. According to one exemplary embodiment, the bearing is formed from a single solid body and the cuts may be formed by any suitable method, including but not limited to electro-discharge machining (EDM), electrochemical machining (ECM), laser cutting, water cutting, or conventional machining. According to other exemplary embodiments, the bearing may be formed in another way, such as casting, injection molding, powder metal die casting, or extrusion.

Figure 4:
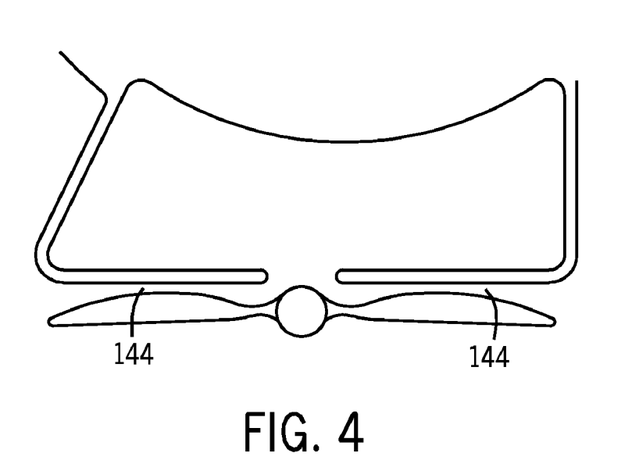
FIG. 4 is an illustration of a tilt pad integral with a support structure configured to rotate about a pin positioned in a bore defined in the support structure, including a web having a variable cross-section.

According to one exemplary embodiment, the cuts 28 in the housing 20 and the webs 44 are a generally constant thickness. Referring to FIG. 4 and according to another exemplary embodiment, the thickness of the webs 144 may vary along the length of the webs 144. Varying the thickness of the webs may be desirable in some embodiments to achieve the desired bearing pad stiffness, minimize the stresses in the webs, and increase the fatigue life of the webs.

The webs 44 extend outward from a generally cylindrical bore 24 formed in the housing 20 disposed between the bearing pad 40 and the housing 20. A pivot or pin 50 is received in the bore 24 provides one or more axis about which the bearing pad 40 rotates relative to the housing 20. The pivot 50 is an elongated member that provides a high stiffness behind the pad 40 and a single axis or multiple axis about which the bearing pad 40 can rotate. The shape of the pin 50 may be manipulated to provide a point, near point, line or area contact between the bearing pad 40 and the pin 50. The pin 50 may be formed from a hardened metal or other material depending on the stiffness desired.

Figure 5A:
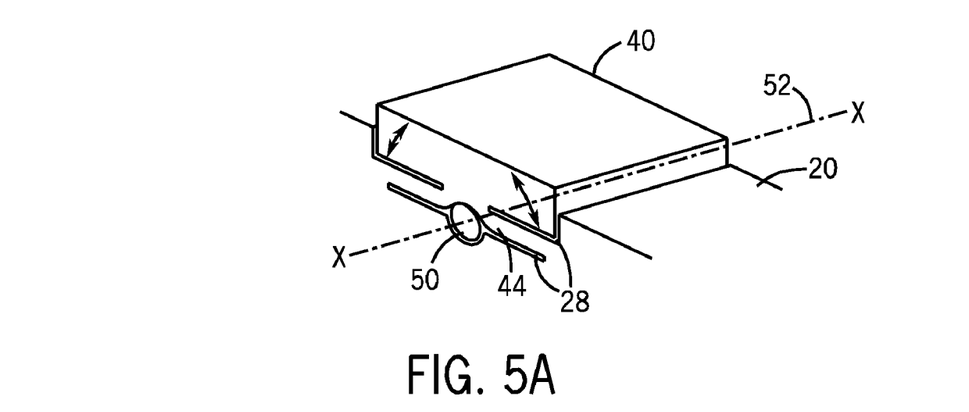
FIG. 5A is a perspective view of an exemplary embodiment of a tilt pad integral with a support structure, the tilt pad configured to rotate about the x-axis of a pin disposed in the support structure.
Figure 5B:
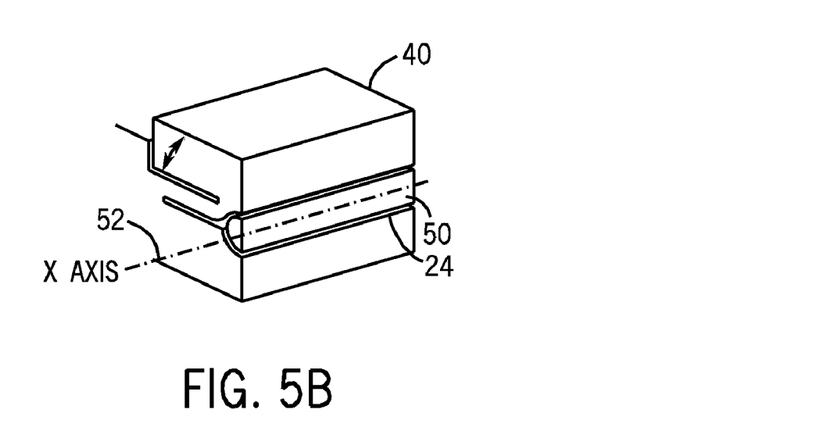
FIG. 5B is a sectional view of the tilt-pad illustrated in FIG. 5A illustrating the geometric shape of the pin and bore defined in the support structure.

According to one exemplary embodiment, as shown best in FIGS. 5A and 5B, the pin 50 may be cylindrical with a diameter that is constant along the length of the pin 50. The pin 50 is received in a generally cylindrical bore 24. The bearing pad 40 is allowed to rotate about the x-axis 52 of the pin 50.

The bore 24 may have a non-circular cross-section. As shown in FIG. 8A, the bore 24 may have an first portion 24a that is opposite of the bearing pad 40 and a second portion 24b that is proximate to the bearing pad 40. According to an exemplary embodiment, the first portion 24a has a diameter that is less than or equal to the diameter of the pin 50 so that there is an interference fit between the pin 50 and the first portion 24a of the bore 24. The second portion 24b has a diameter that is greater than the diameter of the pin 50 so that the bearing pad 40 pivots on the pin 50 instead of sliding along the pin 50. As the diameter of the second portion 24b approaches infinity, as shown in FIGS. 5D-E, it may form a substantially flat surface.

Figure 5C:
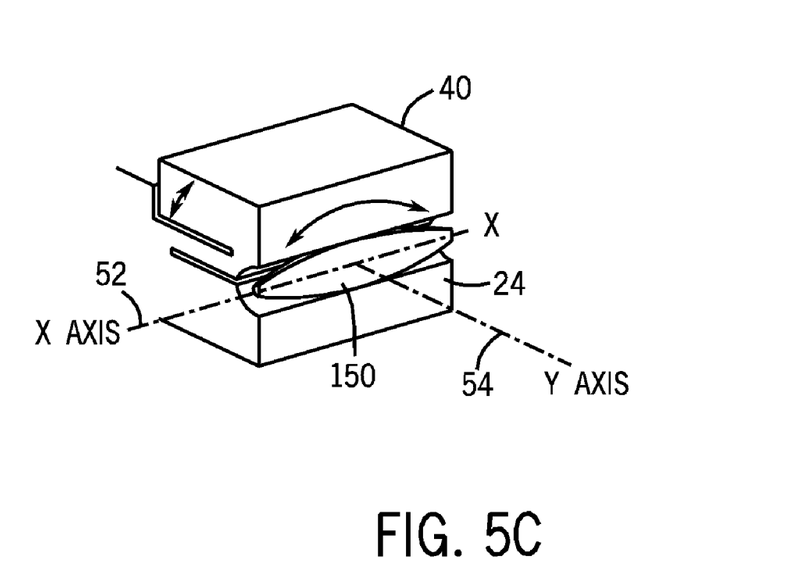
FIG. 5C is a sectional view of a tilt pad integral with a support structure, with a pin including a spherical surface disposed in a cylindrical bore in the support structure, the tilt pad configured to rotate about the x-axis and y-axis of a pin disposed in the support structure.
Figure 5D:
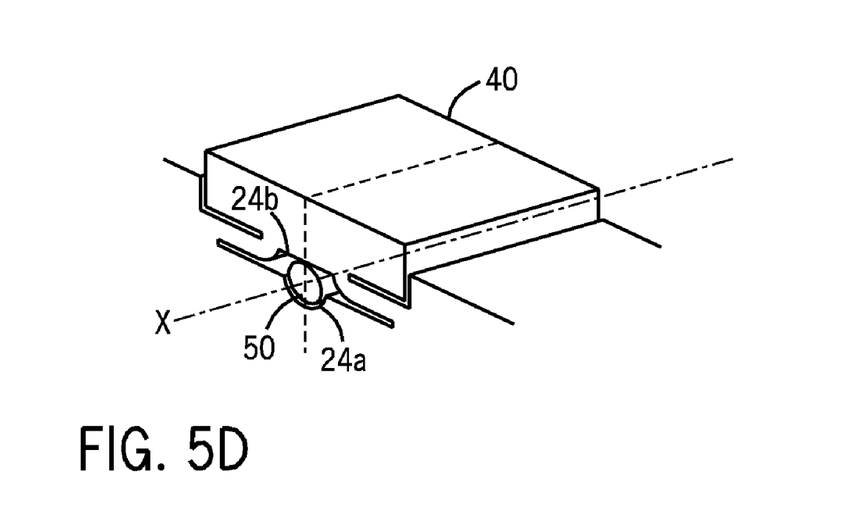
FIG. 5D is a perspective view of an exemplary embodiment of a tilt pad integral with a support structure, the tilt pad configured to rotate about the x-axis of a pin disposed in the support structure. The pin is received in a bore with a non-circular cross-section.
Figure 5E:
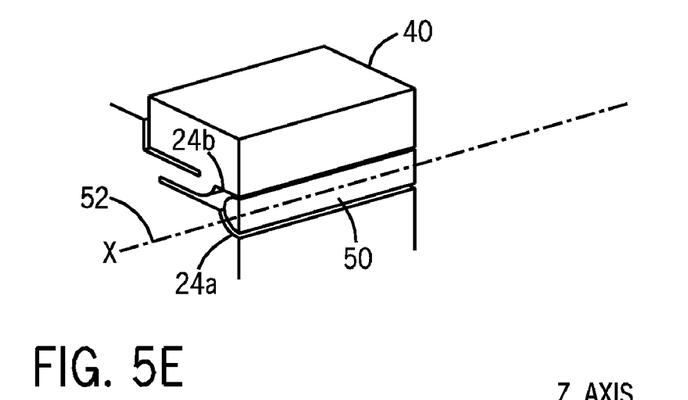
FIG. 5E is a sectional view of the tilt-pad illustrated in FIG. 5D illustrating the geometric shape of the pin and bore defined in the support structure.
Figure 6:
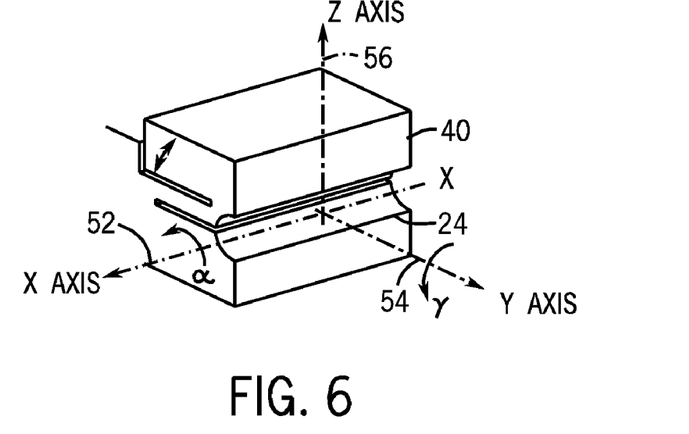
FIG. 6 is a perspective sectional view of a tilt pad integral with a support structure, the support structure defines a bore configured to receive a pin.

According to another exemplary embodiment, and shown best in FIG. 5C, the pin 150 has a varied diameter and a spherical longitudinal cross-section. The bearing pad 40 is allowed to rotate about both the x-axis 52 of the pin 150 and the y-axis 54 of the pin 150. Another embodiment provides a non-constant bore with a pin defining a cylindrical, longitudinal cross-section allowing the pin to tilt about the x-axis and the y-axis of the pin since the bore diameter varies along its length. According to still another exemplary embodiment, shown best in FIG. 6, the bearing 10 may have no pin in the bore 24. With no pin in the bore 24, the bearing pad 40 is allowed to rotate about the x-axis 52, rotate about the y axis 54 and translate along the z-axis 56. If the pin material is varied, the motion along the x-axis can be influenced.

Figure 7:
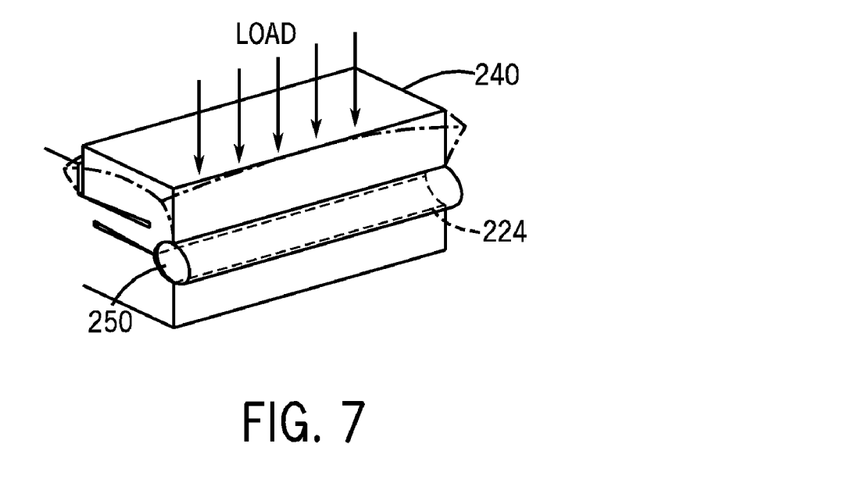
FIG. 7 is a perspective sectional view of a tilt pad integral with a support structure, including a pin configured to reduce stress concentration in the tilt pad when under load.

According to still another exemplary embodiment, shown in FIG. 7, the bearing 10 may include a bore 224 and a pin 250 that are configured to reduce the stress concentration around the bore 224 when the rotating shaft 5 deforms the bearing pad 240. When a load is applied to the bearing pad 240, it tends to compress which flattens or otherwise deform the bore 224. Using finite element analysis (FEA) or another suitable analysis, the deformed shape may be anticipated. Instead of a linear, oval, elliptical or other formula-based shape, the pin 250 and bore 224 are created to match the FEA model or free-form shape. Anticipating and compensating for the deformation of the bore 224 helps to ensure proper pad rotation and stiffness.

Figure 8B:
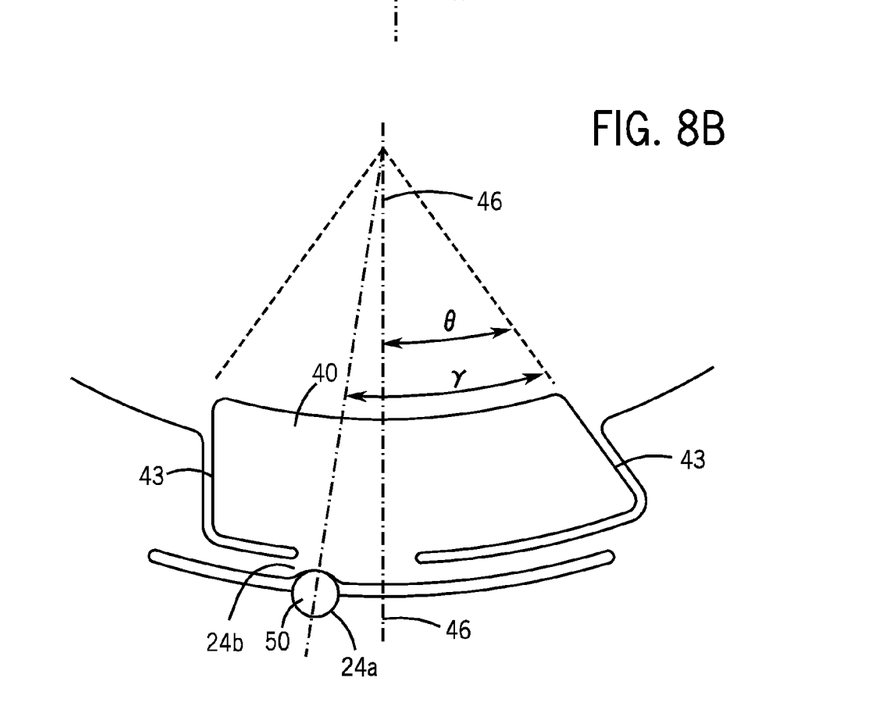
FIG. 8B is an illustration of a tilt pad integral with a support structure configured to rotate about a pin positioned in a bore defined in the support structure on a radial line offset a preselected angle from radial center line of the tilt pad.

The location of the bore 24 relative to the radial centerline 46 of the bearing pad 40 may be varied. Referring to FIG. 8A and according to one exemplary embodiment, the bore 24 is located generally aligned with the radial centerline 46 of the bearing pad 40. Referring to FIG. 8B and according to another exemplary embodiment, the bore 24 may be located offset to one side at an angle γ, that is greater than the angle θ of the radial centerline 46.

The placement and configuration of the bores and the configuration of the pins may be the same for all bearing pads in the bearing or may be unique depending on the bearing application.

According to another exemplary embodiment, as shown in FIGS. 9-11B, the bearing may be a thrust bearing 310 and longitudinally support a rotating shaft 5. The bearing 310 includes a cylindrical housing 320, one or more bearing pads 340 coupled to the outer housing 320, one or more pins 350 trapped between the bearing pads 340 and the housing 320, a thrust collar 360 that is aligned with the housing 320 and traps the bearing pads 340 between the thrust collar 360 and the housing 320, and may include a fluid between the other components.

Figure 9:
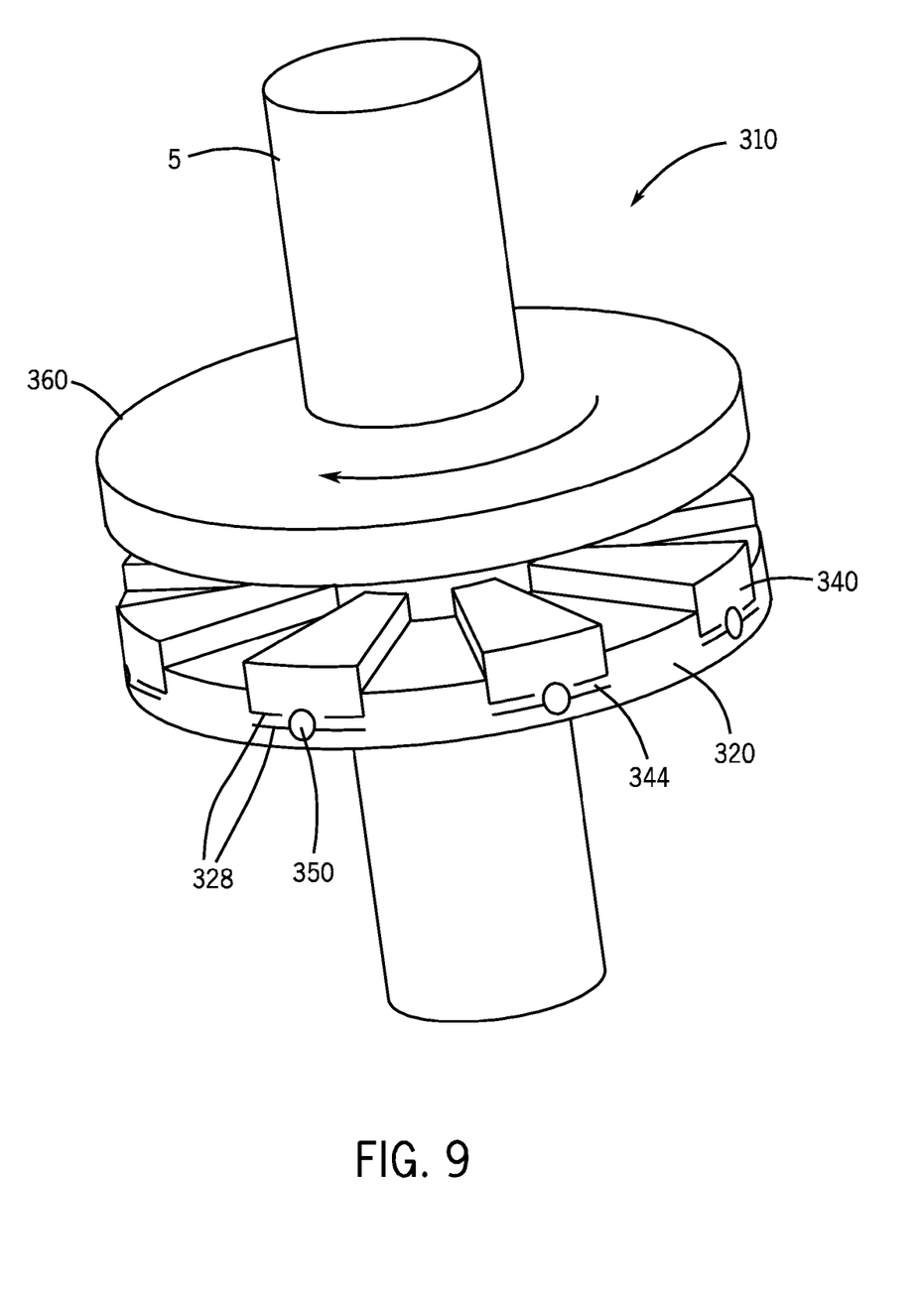
FIG. 9 is a perspective view of a thrust bearing including a plurality of tilt pads integral with a support structure, a thrust collar, and a rotating shaft.
Figure 10A:
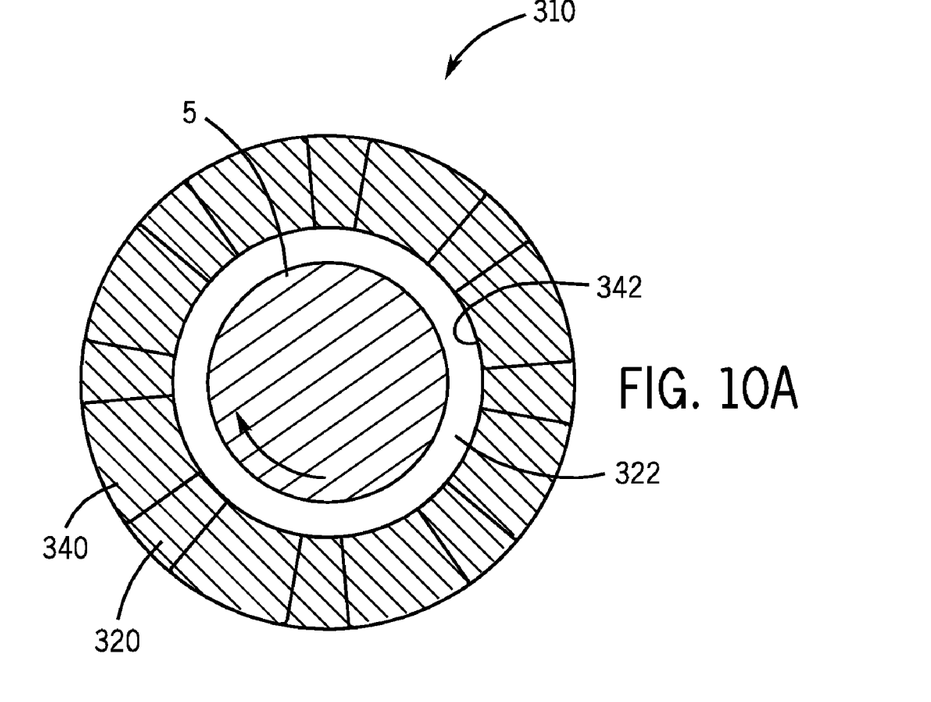
FIG. 10A is a top plan view of an exemplary embodiment of the bearing illustrated in FIG. 9 including a tilt-pad integral disposed longitudinally in a bearing support structure.
Figure 10B:
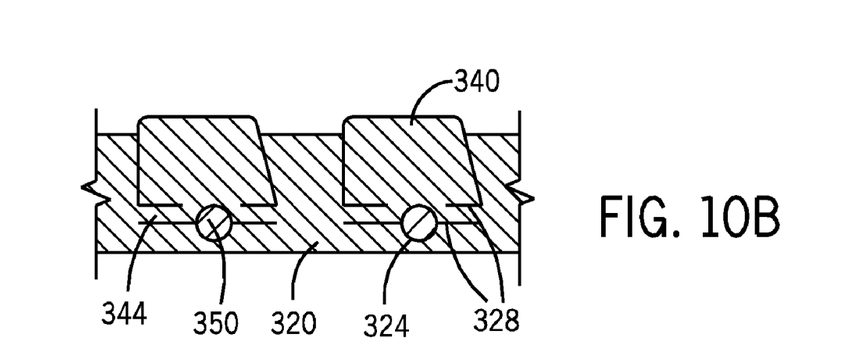
FIG. 10B is a sectional view of the bearing support structure illustrated in FIG. 10A, including two integral tilt pads.
Figure 11A:
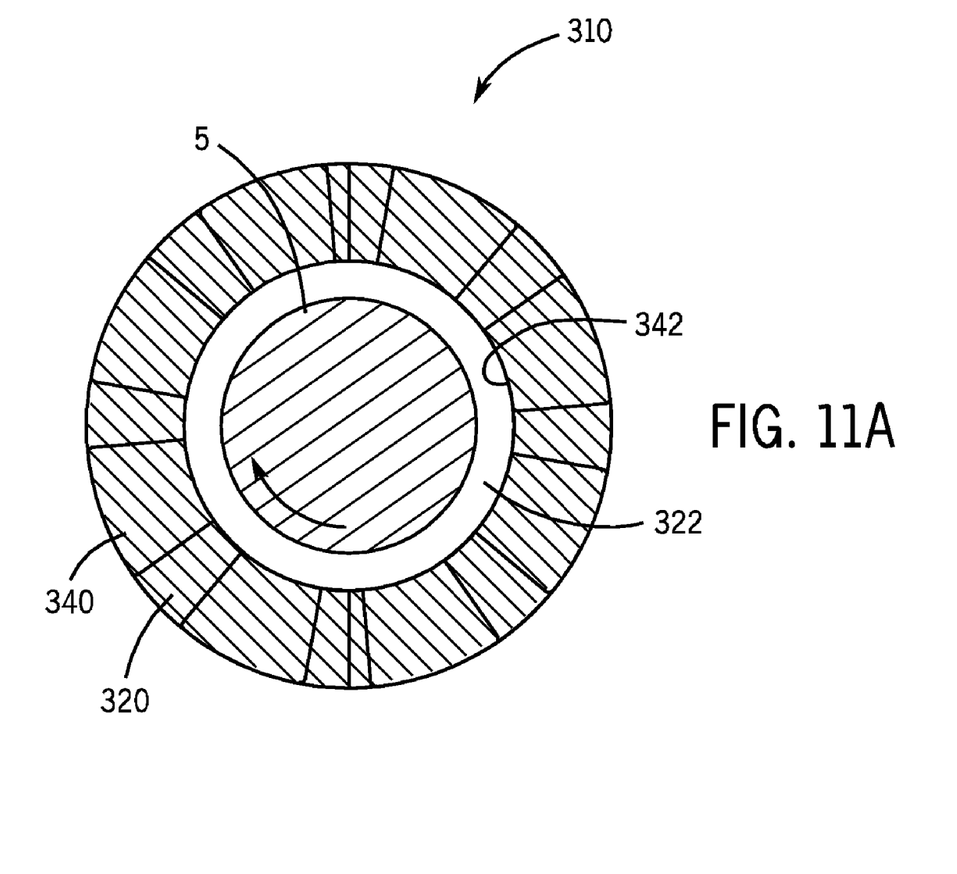
FIG. 11A is a top plan view of the bearing illustrated in FIG. 9, with the support structure including two portions.
Figure 11B:
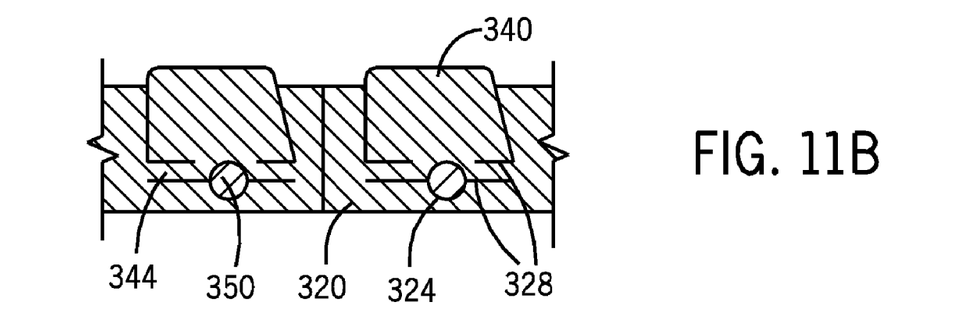
FIG. 11B is a sectional view of the bearing illustrated in FIG. 11A.

The main housing is a generally cylindrical body that defines a central opening 322 configured to receive a rotating shaft 5. The bearing pads 340 are provided on one of the faces of the housing 320 and support the thrust collar 360. Bearing pads 340 are similar to bearing pads 40 and include a circumferential face 342 that defines a portion of the central opening 322. The bearing pads 340 are coupled to the main housing 320 with a pair of webs 344 defined by a multitude of cuts 328 in the housing 320. According to various exemplary embodiments, the housing 320 may be a single body as shown in FIGS. 9-10B or may be split into two or more segments as shown in FIGS. 11A-B and coupled together around the rotating shaft 5. The pins 350 are received in bores 324 formed in the housing 320 and are oriented generally normal to the rotating shaft 5 received by the central opening 322.

Figure 12:
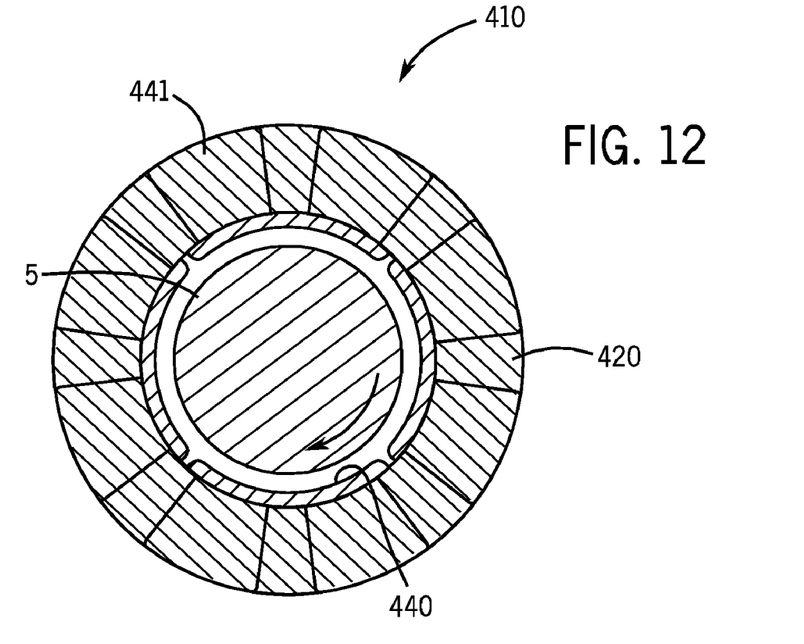
FIG. 12 is a top plan view of an exemplary embodiment of a bearing including a plurality of longitudinal and radial orientated tilt pads integral with a support structure.
Figure 13:
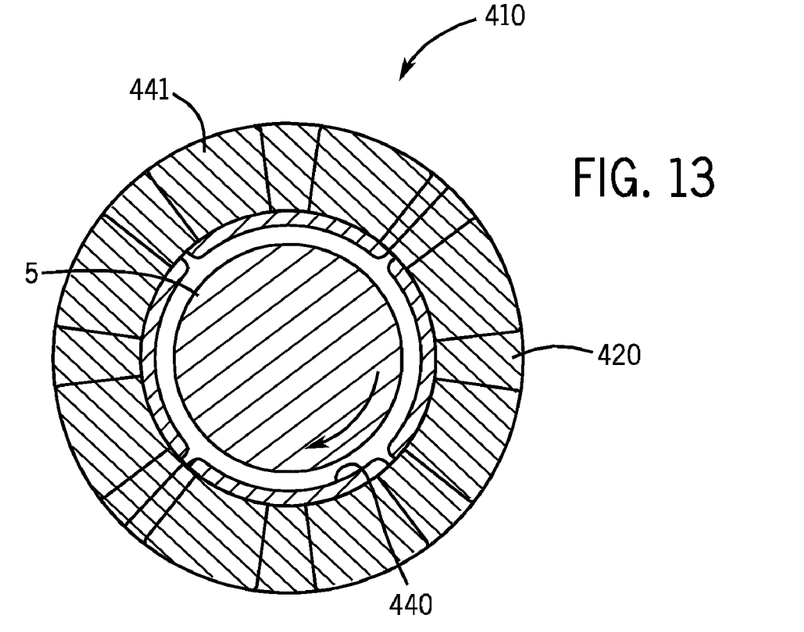
FIG. 13 is a top plan view of the bearing illustrated in FIG. 12, with the support structure including two portions.

According to other exemplary embodiments, the bearing 410 may be a combination thrust and radial bearing and may have a first set of bearing pads 440 that radially support a rotating shaft 5 and a second set of bearing pads 441 that longitudinally support a rotating shaft 5. Bearing pads 440 and 441 are integrally formed as a single unitary body with the housing 420. The housing 420 may be a single body as shown in FIG. 12 or may be split into two or more segments as shown in FIG. 13.

Figure 14A:
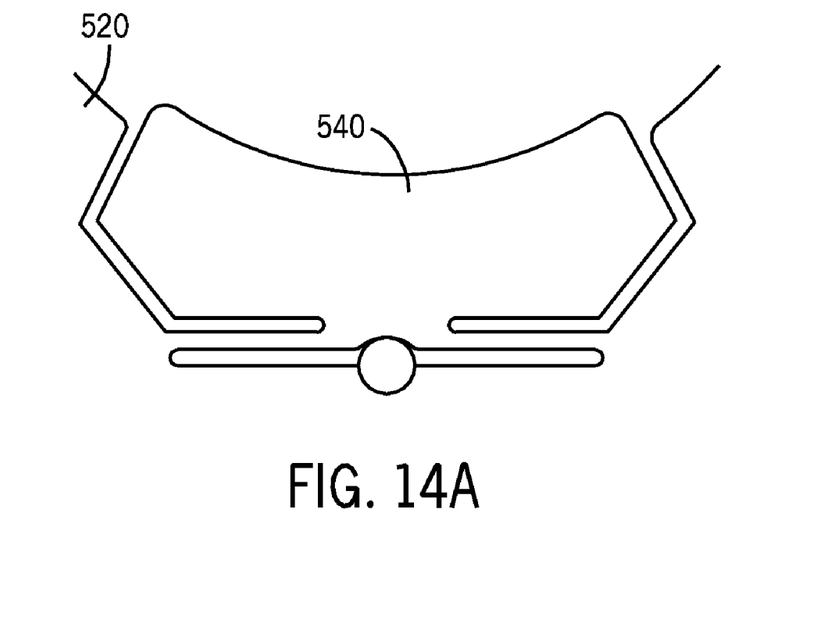
FIG. 14A is an exemplary embodiment of a tilt pad integral with a support structure configured to pivot about a pin positioned in a bore defined in the support structure.
Figure 14B:
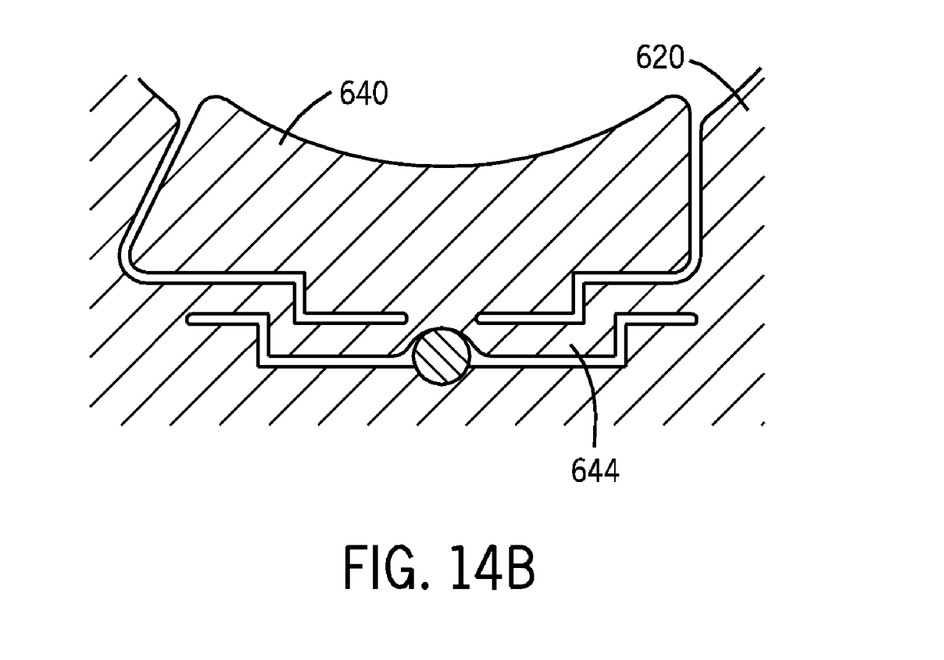
FIG. 14B is a cross section of an exemplary embodiment of a tilt pad integral with a support structure configured to pivot about a pin positioned in a bore defined in the support structure.

The bearing pads may have a four-sided profile or may have other varied shapes. As shown in FIG. 14A, the bearing pads 540 coupled to the housing 520 may have a hexagonal shape. The bearing pads 640 may be coupled to the housing 620 with stepped webs 644, as shown in FIG. 14B.

Figure 15:
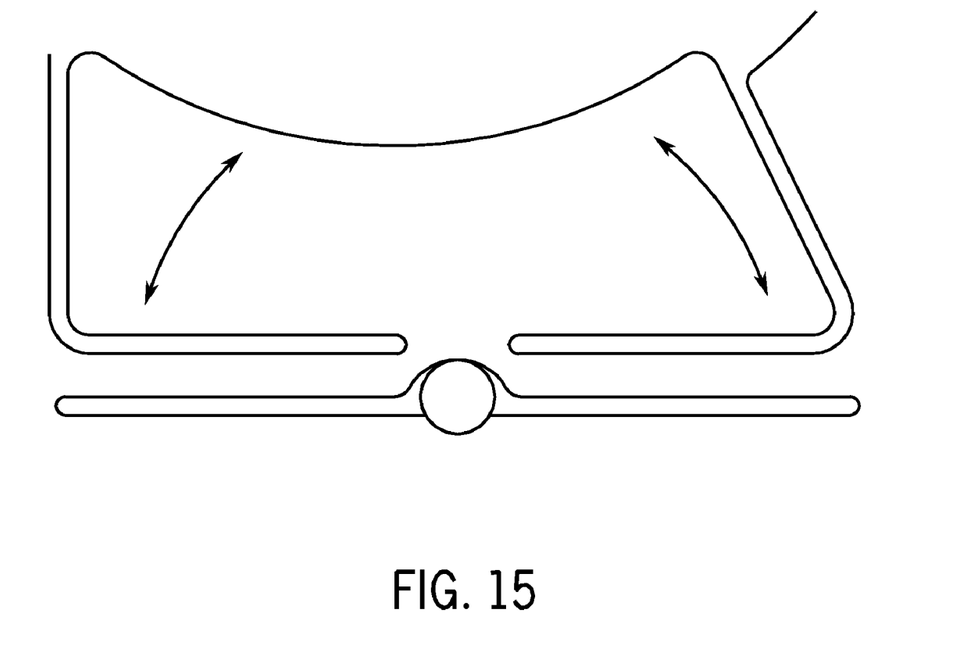
FIG. 15 is a schematic illustration of tilt pad integral with a support structure, including oil disposed in a slots defined in the support structure, with the oil pressure producing a force proportional to tilt pad rotational velocity.

Any of the bearings described above may include attributes common in hydrodynamic bearings (e.g., flooded lubrication, directed lubrication, hydrostatic support features, etc.). As shown in FIG. 15, oil or another fluid, for example process fluid used in lubricated hydrodynamic bearings, may be diverted to, supplied to, or trapped in the cuts that form the bearing pads and webs. The fluid, for example oil, is routed to the cuts through conduits defined in the housing of the bearing, the conduits are in fluid communication with a source of fluid and the cuts are formed in the housing by well known methods. The oil is compressed as the bearing pad rotates about the pin, which increases the pressure of the oil in the compressed cuts. The increased pressure produces a damping force that opposed the force rotating the bearing pad and proportional to the rotational velocity of the rotating shaft. The dampening force further reduces pad flutter.

While the embodiments shown in the FIGURES illustrate a bearing that is generally shown as being formed from a single body or two halves formed from a single body, it should be understood that many variations are possible. According to other exemplary embodiments, the bearing may be formed from a combination of materials that are coupled or fastened together. The bearing material can be metal, plastic, wood, composite materials, sintered powder metal, self lubricating materials, or any other suitable material.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Describing the bearing with Figures should not be construed as imposing on the bearing any limitations that may be present in the Figures. The bearing contemplates methods, systems and program products on any machine-readable media for accomplishing its operations. The embodiments of the bearing may be implemented using an existing computer processors, or by a special purpose computer processor, incorporated for this or another purpose or by a hardwired system.

The foregoing description of embodiments of the bearing has been presented for purposes of illustration and description. It is not intended to be exhaustive or to limit the bearing to the precise form disclosed, and modifications and variations are possible in light of the above teachings. The embodiments were shown and described in order to explain the principals involved and its practical application to enable one skilled in the art to utilize the bearing in various embodiments and with various modifications as are suited to the particular use contemplated.

It is also important to note that the construction and arrangement of the elements of the bearing as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces (e.g. clamps, etc.) may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the bearing. Other substitutions, modifications, changes and omissions may be made in the design, operating conditions and arrangement of the preferred and other exemplary embodiments.

What is claimed is:

1. A bearing to support a rotating shaft comprising:
   a cylindrical housing defining a central opening;
   a plurality of bearing pads integrally coupled to the housing, each bearing pad having a circumferential surface defining a portion of the central opening; and
   a plurality of pins disposed in a corresponding plurality of bores defined in the housing, with each pin aligned as a pivot for each corresponding pad,
   wherein each pad can tilt about a corresponding pin in relation to the rotating shaft, and wherein each pad is coupled to the housing by a pair of webs defined by a plurality of cuts forming a plurality of openings in the housing substantially parallel to a line tangent with the circumferential surface of the pad.

2. The bearing of claim 1, wherein each pin is aligned parallel with the rotating shaft.

3. The bearing of claim 1, wherein each bore has a constant diameter and each pin defines a cylindrical, longitudinal cross-section, wherein each pad can tilt about an x-axis of the corresponding pin.

4. The bearing of claim 1, wherein each bore has a constant diameter and each pin defines a spherical, longitudinal cross-section, wherein each pad can tilt about the x-axis and a y-axis of each corresponding pin.

5. The bearing of claim 1, wherein the bore and pin are offset from a radial centerline of the pad.

6. The bearing of claim 1, wherein each web varies in thickness as defined by the cuts in the housing.

7. The bearing of claim 1, including a fluid in each opening and further including a fluid delivery passage extending through the housing and in fluid communication with each opening, wherein the fluid permits active control of the pad position and pad damping characteristics.

8. The bearing of claim 7, wherein the fluid is oil.

9. The bearing of claim 1, wherein each bore includes a first portion and a second portion, the second portion being closer to the bearing pad than the first portion, the first portion having a diameter less than a diameter of each corresponding pin, the second portion having a diameter greater than the diameter of each corresponding pin.

10. A bearing to support a rotating shaft comprising:
    a cylindrical housing defining a central opening;
    a plurality of bearing pads and housing being part of a single piece of metal, each bearing pad having a circumferential surface defining a portion of the central opening; and
    a plurality of pins disposed in a corresponding plurality of bores defined in the housing, with each pin aligned as a pivot for each corresponding pad,
    wherein each pad can tilt about a corresponding pin in relation to the rotating shaft, and wherein each pad is coupled to the housing by a pair of webs defined by a plurality of cuts forming a plurality of openings in the housing substantially parallel to a line tangent with the circumferential surface of the pad.

11. The bearing of claim 10, the webs, the pads and the housing are part of the single piece of metal.

12. The bearing of claim 11, wherein each bore includes a first portion and a second portion, the second portion being closer to the bearing pad than the first portion, the first portion having a diameter less than a diameter of each corresponding pin, the second portion having a diameter greater than the diameter of each corresponding pin.

* * * * *